United States Patent
Carvajal-Barriga

(10) Patent No.: US 12,338,297 B2
(45) Date of Patent: Jun. 24, 2025

(54) METHOD FOR OBTAINING SULFATED NANOPARTICLES OF CELLULOSE AND MANNAN FROM ENDOSPERMS

(71) Applicant: PanoMatrix, LLC, Columbus, OH (US)

(72) Inventor: Enrique Javier Carvajal-Barriga, Columbus, OH (US)

( * ) Notice: Subject to any disclaimer, the term of this patent is extended or adjusted under 35 U.S.C. 154(b) by 0 days.

(21) Appl. No.: 18/769,736

(22) Filed: Jul. 11, 2024

(65) Prior Publication Data
US 2025/0019467 A1    Jan. 16, 2025

Related U.S. Application Data

(60) Provisional application No. 63/526,471, filed on Jul. 13, 2023.

(51) Int. Cl.
*C08B 15/00* (2006.01)
*C08B 37/00* (2006.01)

(52) U.S. Cl.
CPC .......... *C08B 15/00* (2013.01); *C08B 37/0006* (2013.01)

(58) Field of Classification Search
CPC ............................ C08B 15/00; C08B 37/0006
See application file for complete search history.

(56) References Cited

U.S. PATENT DOCUMENTS

2017/0027168 A1    2/2017    Heath

FOREIGN PATENT DOCUMENTS

WO         2014147287 A1    9/2014

OTHER PUBLICATIONS

Hemmati, F., et al. International Journal of Biological Macromolecules. 2019, 137, 374-381. (Year: 2019).*
Lu, Y., et al. Cellulose. 2019, 26:3735-3745. (Year: 2019).*
International Search Report and Written Opinion of the International Searching Authority received in International Patent Application No. PCT/US2024/037557; mailed Oct. 10, 2024; 9 pages.
Carvajal-Barriga, et al. "Opportunities for Ivory Nut Residue Valorization as a Source of Nanocellulose Colloidal Suspensions," Gels, Dec. 30, 2022 (Dec. 30, 2022), vol. 9, Iss. 1, pp. 1-15.
Carvajal-Barriga, et al. "Sulfated endospermic nanocellulose crystals prevent the transmission of SARS-CoV-2 and HIV-1," Scientific Reports, Apr. 28, 2023 (Apr. 28, 2023), vol. 13, No. 6959, pp. 1-12.
Dorris, et al. "Gelation of cellulose nanocrystal suspensions in glycerol," Cellulose, Feb. 29, 2012 (Feb. 29, 2012), vol. 19, pp. 687-694.

* cited by examiner

*Primary Examiner* — Eric Olson
*Assistant Examiner* — Samuel L Galster

(57) ABSTRACT

A method for obtaining highly sulfated nanoparticles of cellulose or sulfated nanoparticles of mannan, or a combination thereof, from endosperms, comprising acquiring a ground flour of an endosperm of a seed, nut, or pit, wherein the ground flour contains polysaccharides, and wherein the polysaccharides contain either cellulose or mannan, or both cellulose and mannan; pretreating the ground flour to condition the polysaccharides for hydrolysis and functionalization thereof; preparing a reagent for hydrolysis and functionalization of the polysaccharides, wherein the reagent comprises a solution of glycerol, water, and sulfuric acid at predetermined concentrations; adding the reagent to the pretreated polysaccharides to form a suspension, wherein adding the reagent to the suspension converts the cellulose or mannan or both into nanoparticles that are sulfated by the reagent; separating the sulfated nanoparticles from the suspension; washing the nanoparticles; and creating a stable colloidal suspension of the sulfated nanoparticles. The sulfated nanoparticles are used in pharmaceutical, cosmetic, wound healing, and skin treatment formulations.

25 Claims, 8 Drawing Sheets

METHOD FOR OBTAINING SULFATED NANOPARTICLES OF CELLULOSE AND MANNAN FROM ENDOSPERMS

CROSS-REFERENCE TO RELATED APPLICATIONS

This patent application claims the benefit of U.S. Provisional Patent Application Ser. No. 63/526,471 filed on Jul. 13, 2023 and entitled "Method for Obtaining Highly Sulfonated Nanocellulose Particles from Endosperms", the disclosure of which is hereby incorporated by reference herein in its entirety and made part of the present U.S. utility patent application for all purposes.

BACKGROUND

The disclosed technology relates in general to systems and methods for extracting polysaccharides from certain feedstock materials such as, for example, ivory nuts, wherein these polysaccharides include cellulose, mannans, or a combination thereof; and more specifically to systems and methods for obtaining sulfated nanoparticles of cellulose, sulfated nanoparticles of mannan, or sulfated nanoparticles of both cellulose and mannans from endosperms.

Sugarcane bagasse, cereal straw, wood chips, empty fruit bunches, and other agroindustrial leftovers are useful as renewable resources for use in obtaining chemicals, fuels, fertilizers, or materials. Specifically regarding palm trees, some species are exploited as vegetable oil sources (e.g., the oil palm, *Elaeis guineensis*), while other species, such as coconut trees (*Cocos nucifera*), and date palms (*Phoenix dactylifera*), are grown for their edible fruits. However, some by-products of these organisms are also valuable. For example, copra meal, obtained as part of the oil extraction process in coconut mills, is used as animal feed because it is rich in fiber, mannan, and proteins. Because other seeds, such as those of avocado and grapes, have been successfully exploited in biorefineries to obtain bio-based materials and polymers, further investigation on the seeds and pits of certain palm tree fruits as reservoirs of specific compounds susceptible of commercial exploitation is desirable.

A palm species native to the coastal region of Ecuador which grows in the tropical and subtropical habitats of the western flanks of the Andes chain (the 'elephant palm tree' *Phytelephas aequatorialis* Spruce), produces seeds referred to as ivory nuts. The endosperm of this seed is whitish and hard and has been traditionally used as a substitute for animal ivory in the manufacturing of buttons for the fashion industry. Such button manufacturing activity has declined due to the development of petroleum-based polymers, but still produces over 400 t/month of endosperm residues. These residues, which typically feature moisture contents below 10 wt % can be used as feedstock for the extraction of chemicals and materials with high added value because they contain fatty acids, galactoglucomannans, and cellulose. Furthermore, the absence of lignin in the endosperm cell walls is useful for the extraction of cellulose nanofibrils because it provides energy and time savings compared to wood-based nanocellulose and avoids the use of polluting chemicals required for the removal of lignin. Additionally, the fact that seed endosperms exhibit only primary cell walls (and not secondary cell walls) makes seed endosperms an important source of unique nanocellulose particles, which are different from those obtained from other vegetable tissues.

Ivory nut seed has been traditionally exploited in Central and South America for obtaining vegetable ivory. The chemical residues resulting from this industry are useful as a source of fatty acids (e.g., by organic extraction) and mannans (e.g., by alkaline dissolution and regeneration). Additionally, cellulose may be recovered at the end of fractionation by acid hydrolysis and further functionalization, with associated advantages over other lignocellulosic sources due to the absence of lignin in the endospermic tissue and the occurrence of exclusively primary with absence of secondary cell walls is regarded as a suitable source of the thinner cellulose type (type I cellulose), which enables the synthesis of thin, regular and homogeneous nanoscale particles of crystalline cellulose. Accordingly, this material has been referred to as endospermic nanocellulose (ENC) and efficient processes and methods for obtaining ENC are of commercial interest. Several processes for extracting and purifying cellulose from sugar beets, citrus pulp, pears, apples, oil palm pulp, and other biomass sources for industrial applications are known. However, the aforementioned feedstocks are not endospermic tissues and thus present sharp structural differences with the endospermic cell wall making it necessary to develop new extraction procedures. Mannans are a class of plant cell wall polysaccharides found in most land plants that also have potential commercial value. Ivory nut and other endosperms contain mannan; however, mannan (especially type II mannan) is typically insoluble in aqueous solution. Therefore, cost-effective methods for obtaining mannan from endosperms are also of interest. Cellulose nanoparticles or nanocrystals can be utilized in the form of hydrogels in biomedical applications such as tissue engineering, medical devices, antimicrobials, or food additives, potentially fulfilling a wide range of industrial needs.

SUMMARY

The following provides a summary of certain example implementations of the disclosed technology. This summary is not an extensive overview and is not intended to identify key or critical aspects or elements of the disclosed technology or to delineate its scope. However, it is to be understood that the use of indefinite articles in the language used to describe and claim the disclosed technology is not intended in any way to limit the described technology. Rather the use of "a" or "an" should be interpreted to mean "at least one" or "one or more".

One implementation of the disclosed technology provides a first method for obtaining sulfated nanoparticles of cellulose, or sulfated nanoparticles of mannan, or a combination thereof, from endosperms, comprising acquiring a ground flour of an endosperm of a seed, nut, or pit, wherein the ground flour contains polysaccharides, and wherein the polysaccharides contain either cellulose or mannan, or both cellulose and mannan; pretreating the ground flour to condition the polysaccharides for hydrolysis and functionalization thereof; preparing a reagent for hydrolysis and functionalization of the polysaccharides, wherein the reagent comprises a solution of glycerol, water, and sulfuric acid at predetermined concentrations; adding the reagent to the pretreated polysaccharides to form a suspension, wherein adding the reagent to the suspension converts either the cellulose into nanoparticles or the mannan into nanoparticles, or converts both the cellulose and the mannan into nanoparticles, and wherein the nanoparticles are sulfated by the reagent; separating either the sulfated nanoparticles of cellulose or the sulfated nanoparticles of mannan from the suspension, or separating both the sulfated nanoparticles of cellulose and the sulfated nanoparticles of mannan from the suspension; washing the nanoparticles; and creating a stable colloidal suspension of the sulfated nanoparticles. The sulfated nanoparticles of cellulose, mannan, or a combination thereof may be included in pharmaceutical formulations, cosmetic formulations, wound healing formulations, skin treatment formulations, and other formulations.

Another implementation of the disclosed technology provides a second method for obtaining sulfated nanoparticles of cellulose, or sulfated nanoparticles of mannan, or a combination thereof, from endosperms, comprising acquiring a ground flour of an endosperm of a seed, nut, or pit, wherein the ground flour contains polysaccharides, and wherein the polysaccharides contain either cellulose or mannan, or both cellulose and mannan; pretreating the ground flour to condition the polysaccharides for hydrolysis and functionalization thereof; preparing a reagent for hydrolysis and functionalization of the polysaccharides, wherein the reagent comprises a solution of glycerol, water, and sulfuric acid at predetermined concentrations; adding the reagent to the pretreated polysaccharides to form a suspension, wherein adding the reagent to the suspension converts either the cellulose into nanoparticles or the mannan into nanoparticles, or converts both the cellulose and the mannan into nanoparticles, and wherein the nanoparticles are sulfated by the reagent; stopping the hydrolysis and functionalization reaction; separating either the sulfated nanoparticles of cellulose or the sulfated nanoparticles of mannan from the suspension, or separating both the sulfated nanoparticles of cellulose and the sulfated nanoparticles of mannan from the suspension; washing the nanoparticles; creating a stable colloidal suspension of the sulfated nanoparticles; adjusting the pH of the colloidal suspension to between 3.0 and 8.0; and homogenizing the stable colloidal suspension. The sulfated nanoparticles of cellulose, mannan, or a combination thereof may be included in pharmaceutical formulations, cosmetic formulations, wound healing formulations, skin treatment formulations, and other formulations, and may be used in tissue engineering applications.

It should be appreciated that all combinations of the foregoing concepts and additional concepts discussed in greater detail below (provided such concepts are not mutually inconsistent) are contemplated as being part of the technology disclosed herein and may be implemented to achieve the benefits as described herein. Additional features and aspects of the disclosed system, devices, and methods will become apparent to those of ordinary skill in the art upon reading and understanding the following detailed description of the example implementations. As will be appreciated by the skilled artisan, further implementations are possible without departing from the scope and spirit of what is disclosed herein. Accordingly, the descriptions provided herein are to be regarded as illustrative and not restrictive in nature.

BRIEF DESCRIPTION OF THE DRAWINGS

The accompanying drawings, which are incorporated into and form a part of the specification, schematically illustrate one or more example implementations of the disclosed technology and, together with the general description given above and detailed description given below, serve to explain the principles of the disclosed subject matter, and wherein.

DETAILED DESCRIPTION

Figure 1:
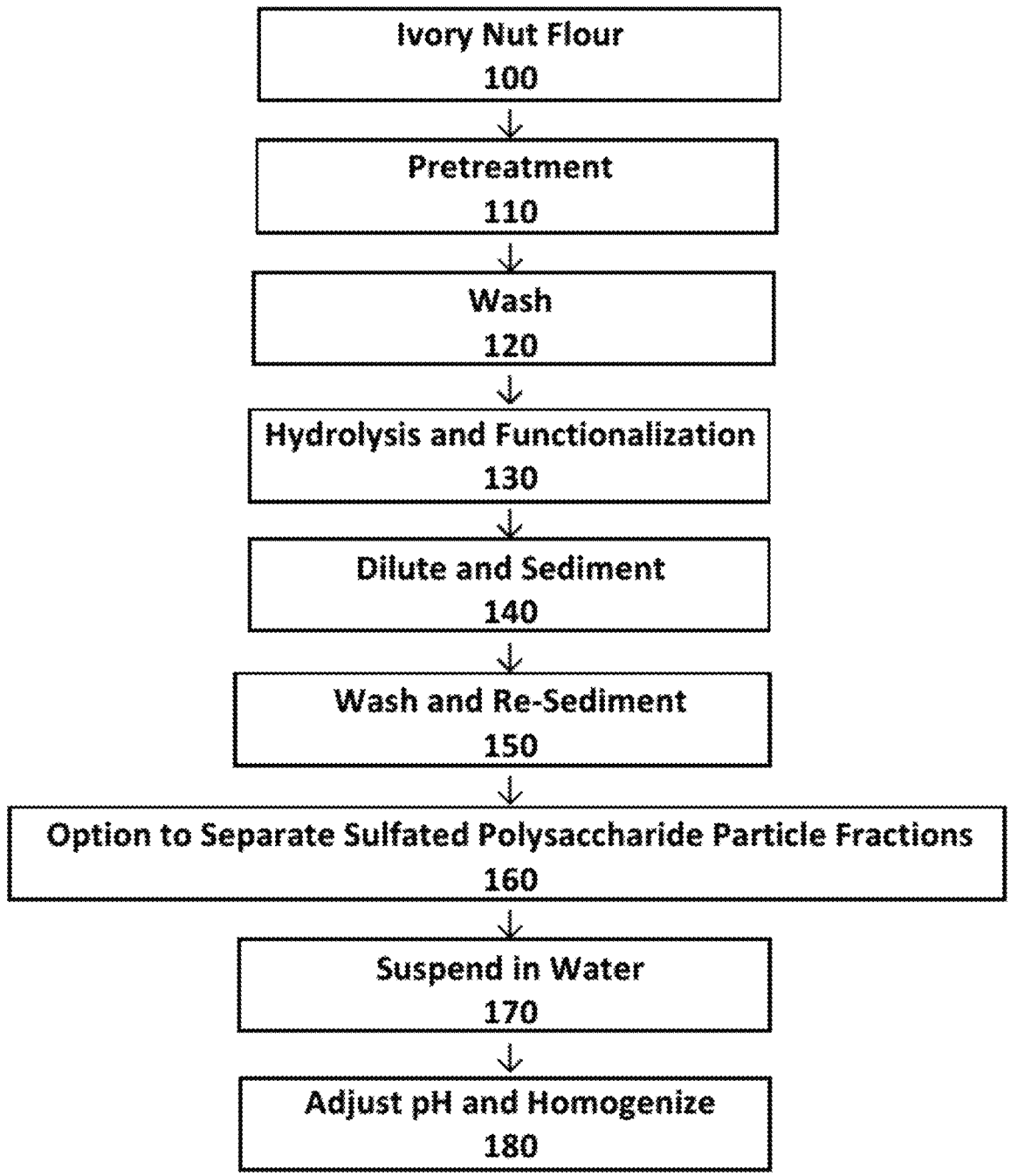
FIG. 1 is a process flow diagram illustrating a first example method for obtaining sulfated nanoparticles of cellulose, or sulfated nanoparticles of mannan, or a combination thereof, from endosperms in accordance with the disclosed technology.

Example implementations are now described with reference to the Figures. Reference numerals are used throughout the detailed description to refer to the various elements and structures. Although the following detailed description contains many specifics for the purposes of illustration, a person of ordinary skill in the art will appreciate that many variations and alterations to the following details are within the scope of the disclosed technology. Accordingly, the following implementations are set forth without any loss of generality to, and without imposing limitations upon, the claimed subject matter.

The examples discussed herein are examples only and are provided to assist in the explanation of the apparatuses, devices, systems, and methods described herein. None of the features or components shown in the drawings or discussed below should be taken as required for any specific implementation of any of these apparatuses, devices, systems, or methods unless specifically designated as such. For case of reading and clarity, certain components, modules, or methods may be described solely in connection with a specific Figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

The disclosed technology provides an optimized method for obtaining sulfated nanoparticles of cellulose from endosperms that, after fatty acid extraction, can be used to produce nanocellulose-based hydrogels having various commercial and medical applications, including use in beauty, cosmetic, skincare and wound healing applications. The disclosed technology also provides an optimized method for obtaining sulfated nanoparticles of mannan from endosperms that, after fatty acid extraction, can be used to produce materials having various commercial and medical applications, including use in beauty, cosmetic, skincare and wound healing applications. The disclosed technology also provides an optimized method for obtaining mixtures of sulfated nanoparticles of cellulose and sulfated nanoparticles of mannan that, after fatty acid extraction, can be used to produce materials having various commercial and medical applications, including use in beauty, cosmetic, skincare and wound healing applications. Mannan is normally insoluble in water/aqueous solution; however, the highly sulfated mannan obtained using the disclosed methods forms suspensions in water, thereby increasing its utility for the stated applications.

An example general method for obtaining highly sulfated nanoparticles of cellulose, or sulfated nanoparticles of mannan, or a combination thereof, from endosperms, comprises acquiring a ground powder or "flour" of an endosperm of a seed, nut, or pit, wherein the ground flour contains polysaccharides, and wherein the polysaccharides contain either cellulose or mannan, or both cellulose and mannan; pretreating the ground flour to condition the polysaccharides for hydrolysis and functionalization thereof; preparing a reagent for hydrolysis and functionalization of the polysaccharides, wherein the reagent comprises a solution of glycerol, water, and sulfuric acid at predetermined concentrations; adding the reagent to the pretreated polysaccharides to form a suspension, wherein adding the reagent to the suspension converts either the cellulose into nanoparticles or the mannan into nanoparticles, or converts both the cellulose and the mannan into nanoparticles, and wherein the nanoparticles are sulfated by the reagent; separating either the sulfated nanoparticles of cellulose or the sulfated nanoparticles of mannan from the suspension, or separating both the sulfated nanoparticles of cellulose and the sulfated nanoparticles of mannan from the suspension; washing the nanoparticles; and creating a stable colloidal suspension of the sulfated nanoparticles. The method may further comprise the following steps: stopping the hydrolysis and functionalization reaction by adding water in a proportion of 2 to 20 parts water to reaction volume (v/v); adding sodium bicarbonate or other predetermined alkaline material to adjust the pH of the colloidal suspension to between 3.0 and 8.0; homogenizing the stable colloidal suspension at 5-20 RPM for 2-10 minutes; and using either dialysis or diafiltration to purify the stable colloidal suspension of sulfated polysaccharide particles. Times, temperatures, and pH ranges for all aspects of the disclosed method(s) may be adjusted and optimized, as will be appreciated by one skilled in the art of organic or polysaccharide chemistry.

In various embodiments, the endosperm is the endosperm of a tagua nut or ivory nut from a tagua palm (*Phytelephas aequatorialis*) or other member of the *Phytelephas* genus, or a nut or seed from another type of palm tree. The endosperm may also be the endosperm of a nut or pit from an avocado, date, coffee bean, peach, apricot, or nectarine; or the endosperm of a cereal or grain; or the endosperm of a seed, nut, or pit that contains hemicellulose, cellulose, or a combination thereof.

In various embodiments, the step of pretreating the ground flour further includes: extracting polysaccharides from the flour by mixing sodium hydroxide (e.g., 5% w/v), potassium hydroxide, or other alkaline material or materials with the flour; incubating the mixture for a predetermined time at a predetermined temperature (e.g., 120 minutes at 50° C.); washing out any excess sodium hydroxide, potassium hydroxide, or other alkaline material or materials to form a solid material; washing the solid material until the solid material changes to a color and pH that indicates the removal of impurities therefrom (e.g., from yellow to white); and optionally, drying the washed solid material for a predetermined time at a predetermined temperature (2-12 hours at 60-120° C.). In other embodiments, pretreating the ground flour further includes extracting polysaccharides from the flour using strong acids such as sulfuric acid, phosphoric acid, or hydrochloric acid. In still other embodiments, pretreating the ground flour further includes extracting polysaccharides from the flour using chaotropic solutions that disrupt polysaccharide hydrogen bonding and ultrastructures. Adding the reagent to the pretreated polysaccharides to form a suspension may further include adding the solid material to the reagent for hydrolysis and functionalization of the polysaccharides in a proportion ranging from 1:6 to 1:10 w/v to form a suspension; and stirring the suspension at 100 to 1000 rpm for 1 to 5 hours at a temperature of 30 to 60° C.

In various embodiments, preparing the reagent for hydrolysis and functionalization of the polysaccharides, which is referred to as the "Carvajal Reagent", further includes combining 30% v/v glycerol and 25% v/v deionized water to form a solution; cooling the solution to 4° C.; adding 45% v/v of concentrated sulfuric acid dropwise to the cooled solution; maintaining the temperature of the solution at or below 10° C.; stirring the solution at 500 rpm; and increasing temperature of the solution to 30-60° C. with continuous agitation for 1-5 hours. Other implementations of the Carvajal Reagent substitute other polyols or combinations of one or more polyols for some or all of the glycerol. The term "polyol refers to an alcohol containing multiple hydroxyl groups. Examples of polyols that may be used with the disclosed methods include, but are not limited to, 1,2-propanediol, 1,3-propanediol, glycerol, 2,3-butanediol, 1,3-butanediol, 2-methyl-1,3-propanediol, 1,2-pentanediol, 1,3-pentanediol, 1,4-pentanediol, 1,5-pentanedial, 2,2-dimethyl-1,3-propanediol, 2-methyl-1,4-butanediol, 2-methyl-1,3-butanediol, 1,1,1-trimethylolethane, 3-methyl-1,5-pentanediol, 1,1,1-trimethylolpropane, 1,7-heptanediol, 2-ethyl-1,6-hexanediol, 1,9-nonanediol, 1,11-undecanediol, diethylene glycol, tricthylene glycol, oligoethylene glycol, 2,2'-thiodiglycol, diglycols or polyglycols prepared from 1,2-propylene oxide, propylene glycol, ethylene glycol, sorbitol, dibutylene glycol, tributylene glycol, tetrabutylene glycol, dihexylene ether glycol, trihexylene ether glycol, tetrahexylene ether glycol, 1,4-cyclohexanediol, 1,3-cyclohexanediol, or any combination thereof. In some embodiments, the reaction of the Carvajal Reagent with the solid material resulting after the pretreatment to condition the endosperm seed flour may include addition of phosphoric acid, other strong acids such as hydrochloric acid, or organic acids such as oxalic acid, to produce other functionalization products (i.e., chemically modified forms of mannan and nanocellulose particles).

In various embodiments, separating either the sulfated nanoparticles of cellulose or the sulfated nanoparticles of mannan from the suspension, or separating both the sulfated nanoparticles of cellulose and the sulfated nanoparticles of mannan from the suspension further includes using gravity sedimentation at a rate of 0.0001 to 500 mL/min; or using centrifugation at a gravitational force greater than 10 times gravity for a time of 2 minutes or greater; or washing a precipitated nanoparticle fraction having a supernatant fraction by discarding the supernatant and resuspending the precipitated nanoparticle fraction in water.

In various embodiments, the stable colloidal suspension is formed by repeating the washing step until the pH of the suspension reaches a pH of 1.7-1.9 prior to final suspension, or until the suspended material remains in a stable colloidal suspension that does not sediment at 1× gravity; or dialyzing the resuspended sediment against water to reach a stable colloidal suspension of the nanoparticles.

Figure 2:
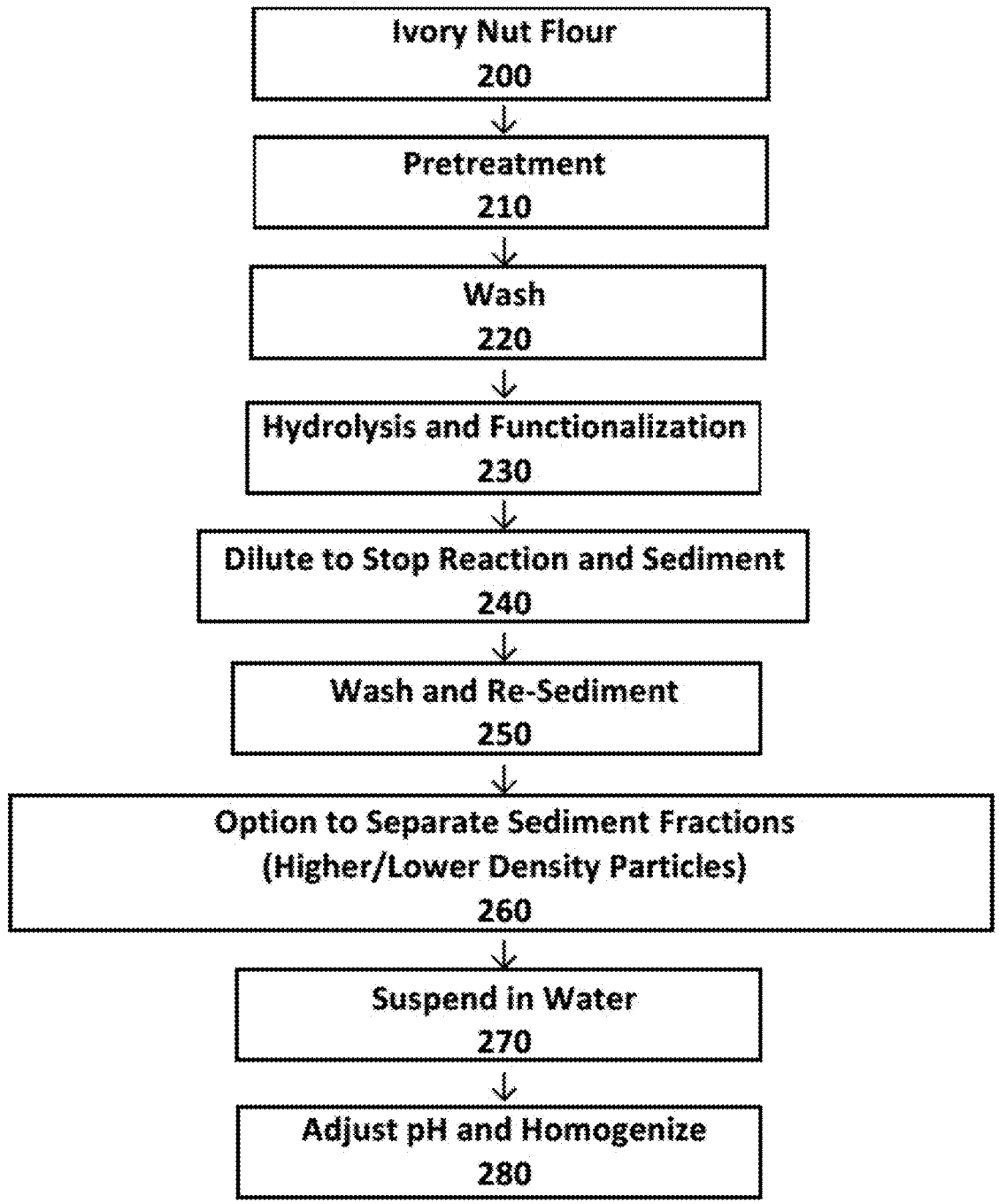
FIG. 2 is a process flow diagram illustrating a second example method for obtaining sulfated nanoparticles of cellulose, or sulfated nanoparticles of mannan, or a combination thereof, from endosperms in accordance with the disclosed technology.

FIG. 1 provides a flowchart illustrating a first example method for obtaining sulfated nanoparticles of cellulose, or sulfated nanoparticles of mannan, or a combination thereof, from endosperms in accordance with the disclosed technology; and FIG. 2 provides a flowchart illustrating a second example method for obtaining sulfated nanoparticles of cellulose, or sulfated nanoparticles of mannan, or a combination thereof, from endosperms in accordance with the disclosed technology. Regarding FIG. 1, the method includes obtaining ivory nut at process step 100; pretreatment at process step 110; washing at process step 120; hydrolysis and functionalization at process step 130; dilution and sedimentation at process step 140; washing and re-sedimentation at process step 150; separating sulfated polysaccharides particle fractions at process step 160; suspending the particle fractions at process step 170; and adjusting pH and homogenization of the obtained material at process step 180.

The disclosed methods may be modified to obtain sulfated polysaccharide fractions of different densities, wherein a higher density fraction is enriched in nanocellulose particles, and a lower density precipitate is enriched in sulfated mannan particles. Regarding FIG. 2, the method includes obtaining ivory nut at process step 200; pretreatment at process step 210; washing at process step 220; hydrolysis and functionalization at process step 230; dilution to stop the reaction and sedimentation at process step 240; washing and re-sedimentation at process step 250; separating sediment fractions (higher/lower density particles) at process step 260; suspending the sediment fractions at process step 270; and adjusting pH and homogenization of the obtained material at process step 280.

The disclosed methods may be modified to obtain a material enriched for highly sulfated mannan particles. Following the dilution of the hydrolysis and functionalization reaction, the gravity sedimentation steps are each carried out at a rate less than one (1) Liter per hour for at least 10 hours, after which there are two distinct layers of sediment; a bottom, denser precipitate, which is enriched in sulfated nanocellulose particles, and above that, a less dense precipitate that is enriched in sulfated mannan particles. To prepare the fraction enriched in sulfated mannan particles, the less dense sediment is separated from the aqueous layer above and from the more dense sediment below, and is then further washed (with diluted 1:5-1:10 in deionized water and then sedimented by gravity (or by centrifugation) and the final steps of the method described above are followed for completion of the preparation process.

The disclosed methods may be modified to obtain mixtures containing both sulfated nanocellulose particles and sulfated mannan particles. The method is the same as that described in the previous paragraph; however, both the more dense and less dense precipitates after extended gravity separation (or separation of both from the aqueous layer by centrifugation for 3-10 minutes at a force of more than 10× gravity) are washed together with water until the pH is approximately 1.7-1.9, after which the two highly sulfated polysaccharide particles are co-purified as previously described.

Figure 3:
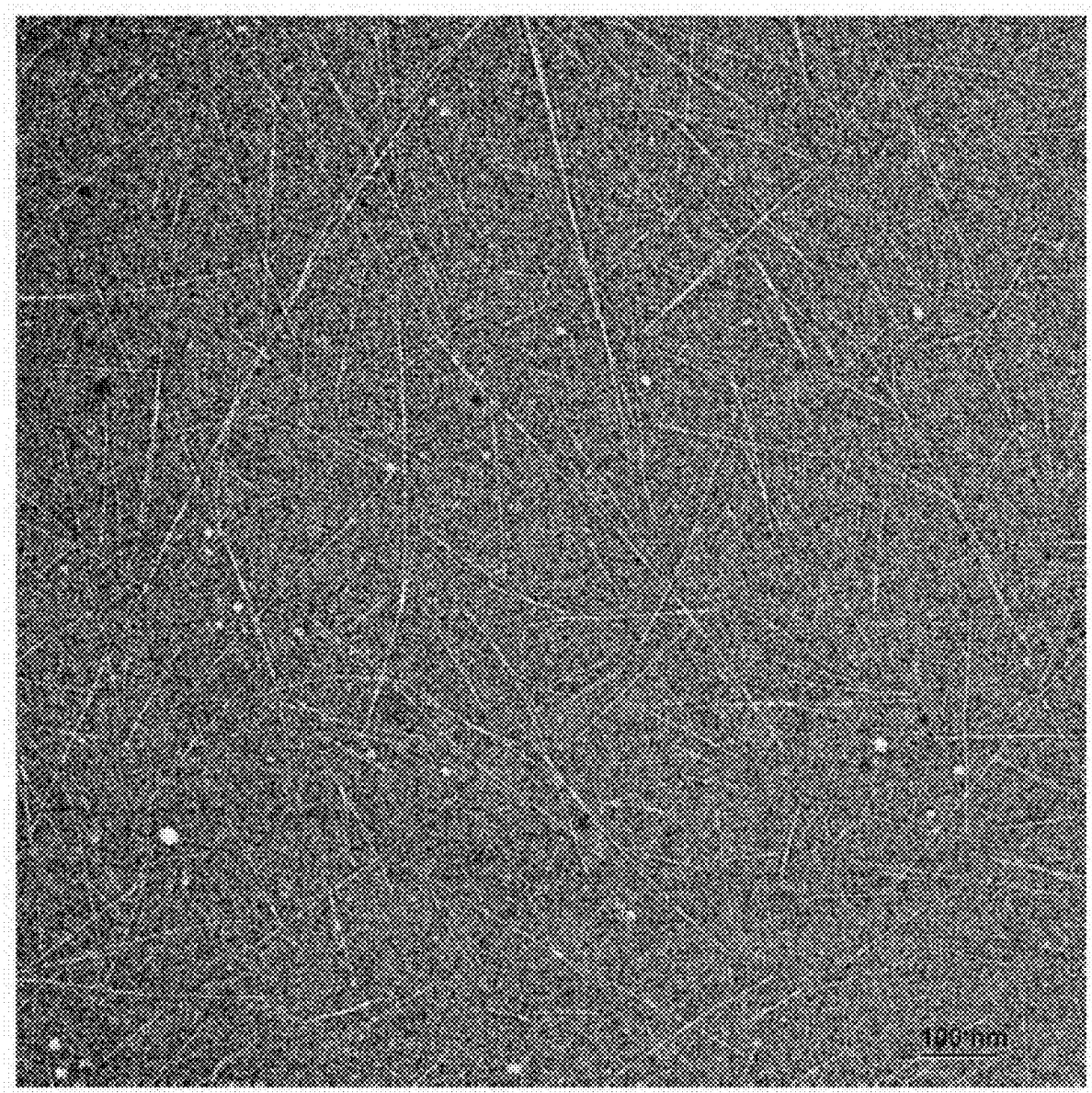
FIG. 3 is an EM photomicrograph of crystalline nanocellulose obtained using the disclosed methods.
Figure 4:
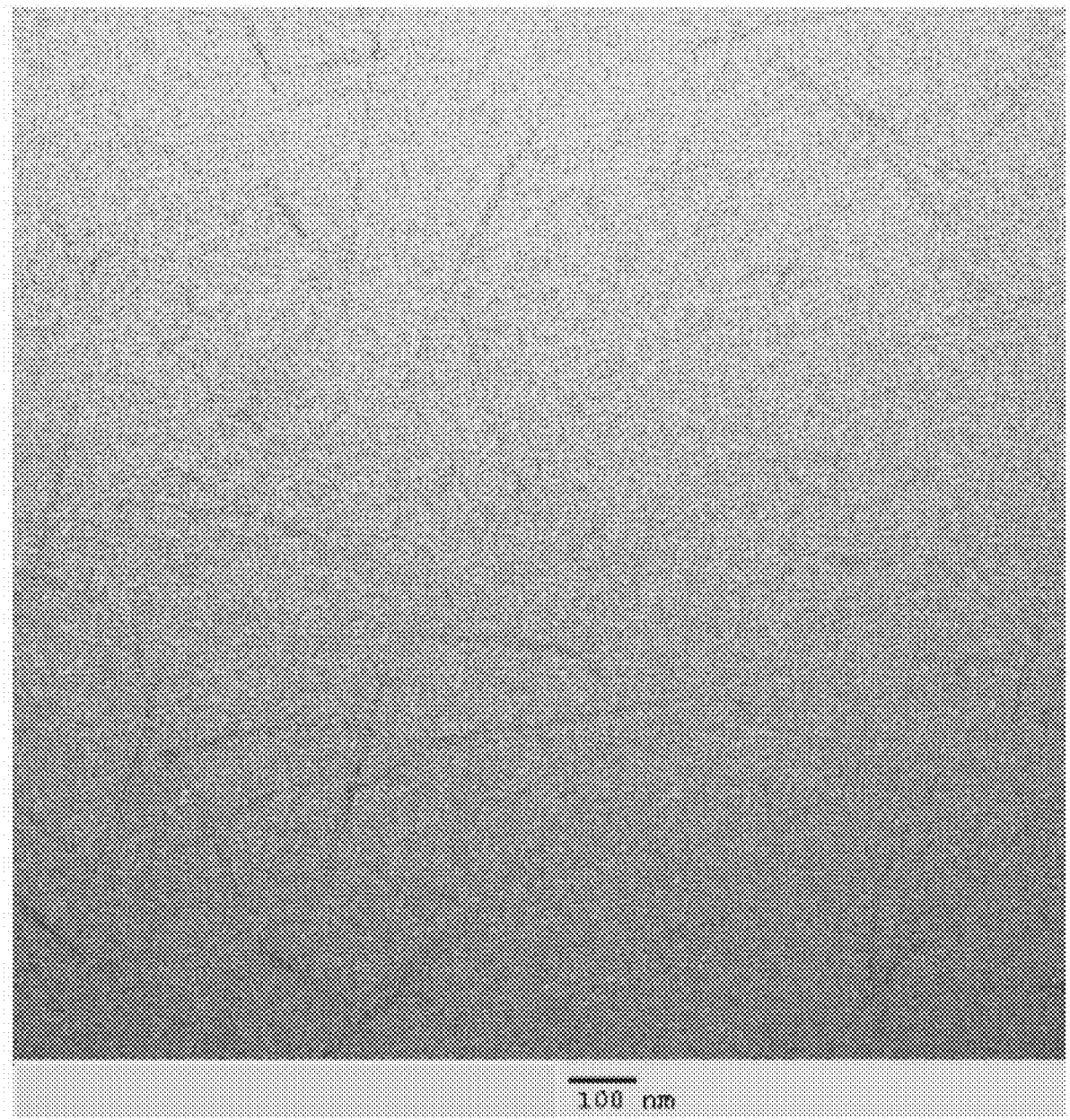
FIG. 4 is a first TEM image of sulfated nanoparticles of cellulose obtained using the disclosed methods.
Figure 5:
FIG. 5 is a second TEM image of sulfated nanoparticles of cellulose obtained using the disclosed methods.
Figure 6:
FIG. 6 is a TEM image of sulfated nanoparticles of mannan obtained using the disclosed methods.
Figure 7:
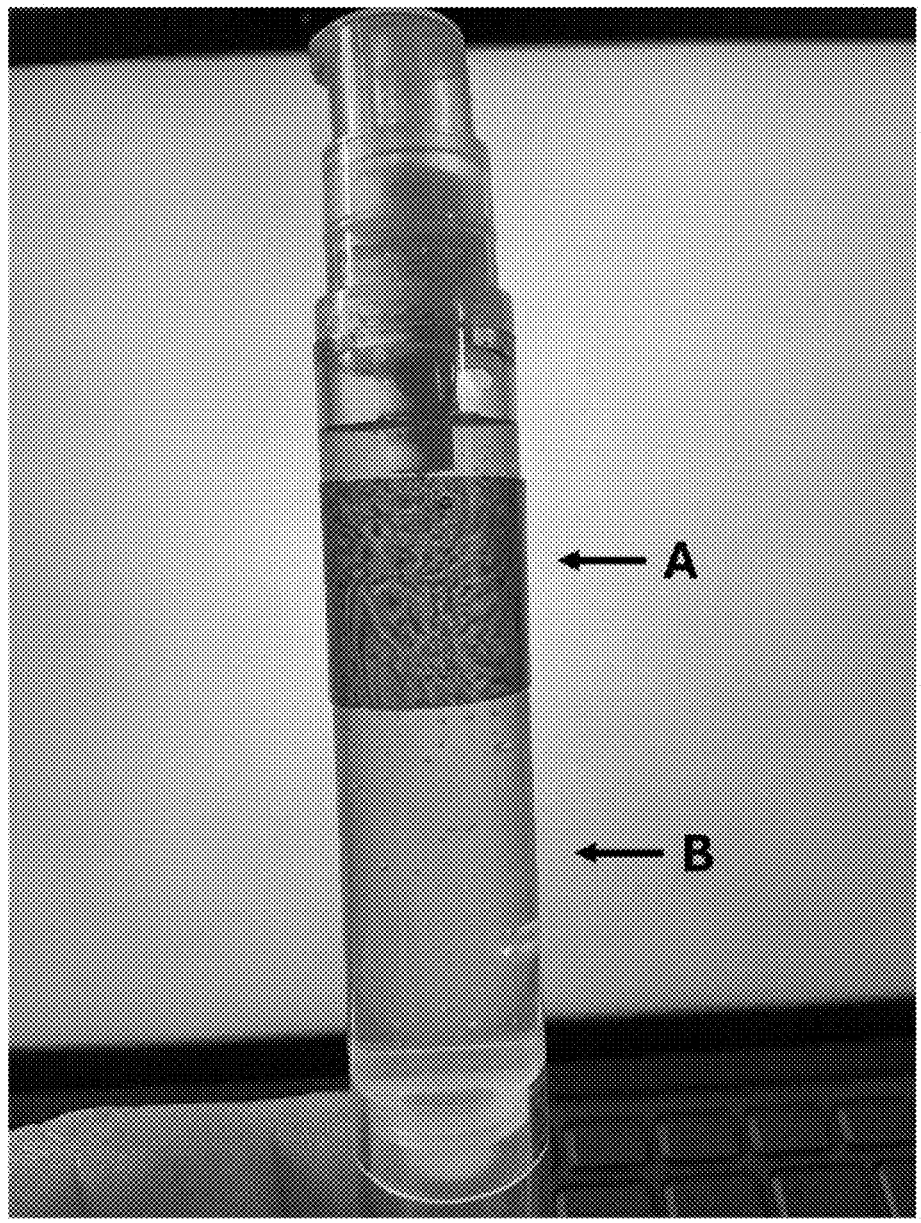
FIG. 7 is a photograph of highly sulfated nanoparticles of cellulose obtained using the disclosed methods depicting birefringence (i.e., image taken through polarized light filters located on both sides of a clear plastic tube through which light was passed showing that the material in the tube is highly crystalline in structure (Arrow A); and that the material remains a stable colloidal suspension that is not cloudy and does not precipitate (Arrow B). The tube was shaken so that bubbles are visible in the lower portion of the image.

FIG. 3 provides an EM photomicrograph of crystalline nanocellulose obtained using the disclosed methods; FIG. 4 provides a first TEM image of sulfated nanoparticles of cellulose obtained using the disclosed methods; FIG. 5 provides a second TEM image of sulfated nanoparticles of cellulose obtained using the disclosed methods; and FIG. 6 provides a TEM image of sulfated nanoparticles of mannan obtained using the disclosed methods. FIG. 7 is a photograph of sulfated nanoparticles of cellulose obtained using the disclosed methods depicting birefringence (i.e., image taken through polarized light filters located on both sides of a clear plastic tube through which light was passed showing that the material in the tube is highly crystalline in structure (Arrow A); and that the material remains a stable colloidal suspension that is not cloudy and does not precipitate (Arrow B). The tube was shaken so that bubbles are visible in the lower portion of the image. Other methods used to produce crystalline nanocellulose sulfate (which do not use the Carvajal Reagent or the other methods disclosed herein) yield crystals having cross-sections (diameters) of 5-20 nM or more and typical lengths of 100-200 nM. However, the disclosed methods yield highly acicular crystals having cross-sections (diameters) as small as 1-4 nM and crystal lengths as long as 300-800 nM in length. EM photomicrographs such as FIG. 3 depict the acicular nature of these crystals.

Figure 8:
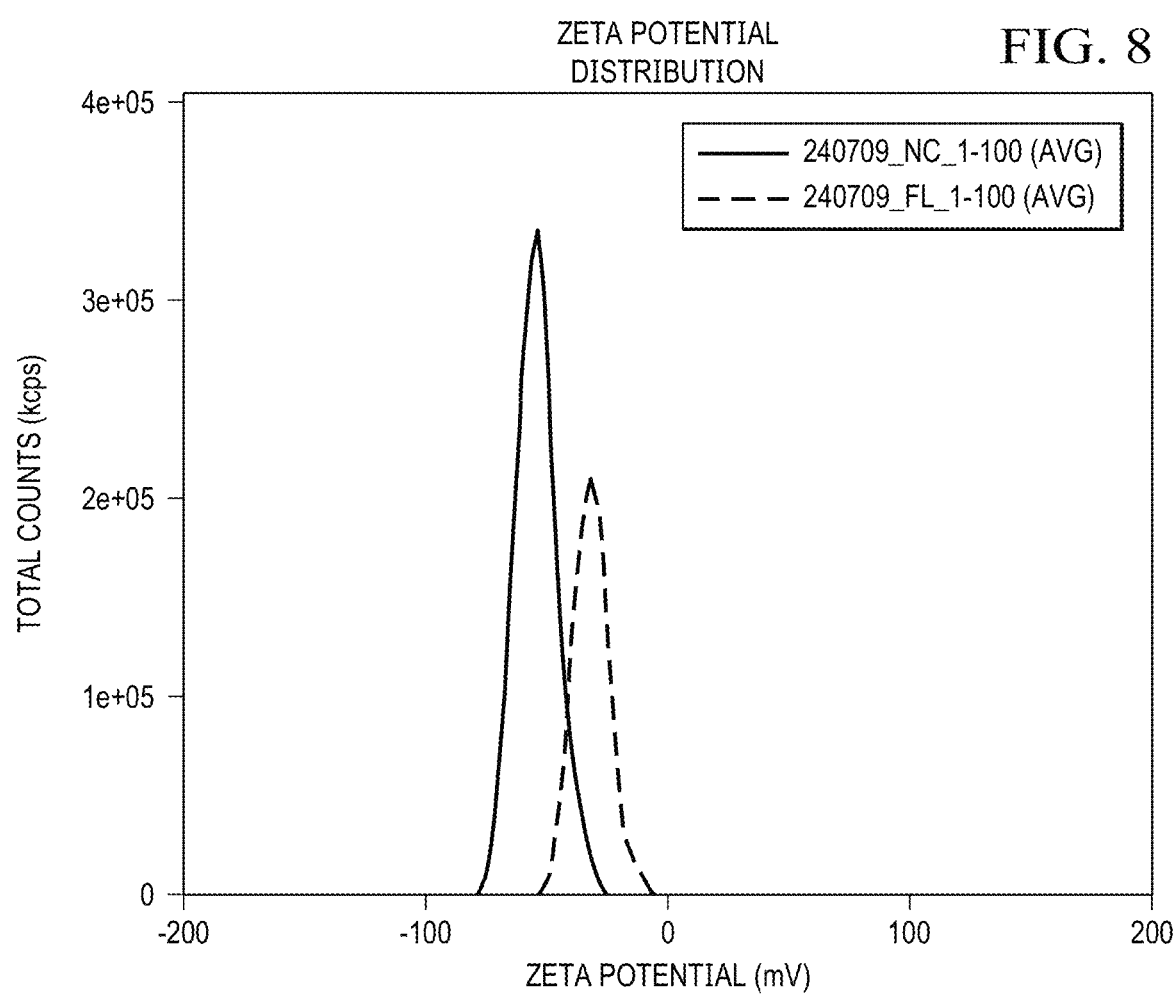
FIG. 8 is a chart comparing the zeta potential of the colloidal suspension of sulfated nanocellulose particles from tagua nut endosperms obtained using the methods disclosed herein compared to a sulfated nanocellulose from the same source material, but prepared by a standard method that does not utilize the disclosed reagents and method steps.

FIG. 8 provides a chart comparing the zeta potential of the colloidal suspension of sulfated nanocellulose particles from tagua nut endosperms obtained using the methods disclosed herein compared to a sulfated nanocellulose derived from the same source material, but prepared using a known, standard method (see Carvajal-Barriga, E. J., Fitzgerald, W., Dimitriadis, E. K. et al. Sulfated endospermic nanocellulose crystals prevent the transmission of SARS-CoV-2 and HIV-1. Sci Rep 13, 6959 (2023)) that does not utilize the "Carvajal Reagent" or other process steps disclosed herein. "Zeta potential" is a term that refers to the measurement of electrokinetic potential in colloidal dispersions. As shown in FIG. 8, the sulfated nanocellulose particles obtained using the disclosed methods (NC: the darker lines in the plots) have a substantially higher level of negative charges per polysaccharide particle surface than sulfated nanoparticles prepared from the same starting material using a sulfuric acid hydrolysis (same concentration) and functionalization step that did not include the combination of concentrated sulfuric acid and concentrated glycerol disclosed herein (labeled FL). FIG. 8 compares zeta potentials of 1:100 dilutions of the sulfated nanocellulose particles (NC) obtained using the disclosed methods and the previously described sulfated nanocellulose particles (FL) prepared without using the specific methods described herein. Each material was sampled and run 12 separate times in a Malvern Panalytical Zeta Potential Analyzer. The average zeta potential for the disclosed sulfated nanocellulose particles was (−53.13) while the average for the previously known sulfated nanocellulose (same particle concentration, same sample pH) was (−27.65). Thus, the sulfated nanocellulose particles obtained using the disclosed methods possess a negative surface charge of approximately twice (2×) that of the material prepared without the Carvajal Reagent. This result suggests the disclosed material possesses twice (2×)

the number of sulfate groups on the surface of the nanocellulose particles compared to the previously known materials.

The methods described above can be used in the creation of platform nanoparticles with multiple functions and uses. The described, highly active nanoparticles have the capacity to react with other molecules for use in nanoencapsulation, various delivery systems (e.g., small or large molecule), various capturing systems, immobilization scaffolds, DNA or RNA vehicles, peptide, polypeptide or protein vehicles, and multiple other industry applications that are apparent to a person having ordinary skill in the art. One advantage of the disclosed technology is the creation of high surface area materials that are sustainable, biodegradable, and highly specific tools at the nanoscale level. Such polymer nanoparticles can perform novel functions for industry, including, but not limited to, the use of sulfated nanocellulose crystals as a scaffold to immobilize viruses such as SARS-CoV-2 and HIV-1, the capture of water-polluting metal ions, the immobilization of yeast cells, and the creation of scaffolds for tissue engineering. The sulfated polysaccharide nanoparticles may also be applied to the skin of people or animals for cosmetic or medical use, including improving skin appearance, retaining moisture, or enhancing wound healing.

All literature and similar material cited in this application, including, but not limited to, patents, patent applications, articles, books, treatises, and web pages, regardless of the format of such literature and similar materials, are expressly incorporated by reference in their entirety. Should one or more of the incorporated references and similar materials differ from or contradict this application, including but not limited to defined terms, term usage, described techniques, or the like, this application controls.

As previously stated and as used herein, the singular forms "a," "an," and "the," refer to both the singular as well as plural, unless the context clearly indicates otherwise. The term "comprising" as used herein is synonymous with "including," "containing," or "characterized by," and is inclusive or open-ended and does not exclude additional, unrecited elements or method steps. Although many methods and materials similar or equivalent to those described herein can be used, particular suitable methods and materials are described herein. Unless context indicates otherwise, the recitations of numerical ranges by endpoints include all numbers subsumed within that range. Furthermore, references to "one implementation" are not intended to be interpreted as excluding the existence of additional implementations that also incorporate the recited features. Moreover, unless explicitly stated to the contrary, implementations "comprising" or "having" an element or a plurality of elements having a particular property may include additional elements whether or not they have that property.

The terms "substantially" and "about", if or when used throughout this specification describe and account for small fluctuations, such as due to variations in processing. For example, these terms can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%, and/or 0%.

Underlined and/or italicized headings and subheadings are used for convenience only, do not limit the disclosed subject matter, and are not referred to in connection with the interpretation of the description of the disclosed subject matter. All structural and functional equivalents to the elements of the various implementations described throughout this disclosure that are known or later come to be known to those of ordinary skill in the art are expressly incorporated herein by reference and intended to be encompassed by the disclosed subject matter. Moreover, nothing disclosed herein is intended to be dedicated to the public regardless of whether such disclosure is explicitly recited in the above description.

There may be many alternate ways to implement the disclosed technology. Various functions and elements described herein may be partitioned differently from those shown without departing from the scope of the disclosed technology. Generic principles defined herein may be applied to other implementations. Different numbers of a given module or unit may be employed, a different type or types of a given module or unit may be employed, a given module or unit may be added, or a given module or unit may be omitted.

Regarding this disclosure, the term "a plurality of" refers to two or more than two. Unless otherwise clearly defined, orientation or positional relations indicated by terms such as "upper" and "lower" are based on the orientation or positional relations as shown in the Figures, only for facilitating description of the disclosed technology and simplifying the description, rather than indicating or implying that the referred devices or elements must be in a particular orientation or constructed or operated in the particular orientation, and therefore they should not be construed as limiting the disclosed technology. The terms "connected", "mounted", "fixed", etc. should be understood in a broad sense. For example, "connected" may be a fixed connection, a detachable connection, or an integral connection, a direct connection, or an indirect connection through an intermediate medium. For one of ordinary skilled in the art, the specific meaning of the above terms in the disclosed technology may be understood according to specific circumstances.

It should be appreciated that all combinations of the foregoing concepts and additional concepts discussed in greater detail herein (provided such concepts are not mutually inconsistent) are contemplated as being part of the disclosed technology. In particular, all combinations of claimed subject matter appearing at the end of this disclosure are contemplated as being part of the technology disclosed herein. While the disclosed technology has been illustrated by the description of example implementations, and while the example implementations have been described in certain detail, there is no intention to restrict or in any way limit the scope of the appended claims to such detail. Additional advantages and modifications will readily appear to those skilled in the art. Therefore, the disclosed technology in its broader aspects is not limited to any of the specific details, representative devices and methods, and/or illustrative examples shown and described. Accordingly, departures may be made from such details without departing from the spirit or scope of the general inventive concept.

What is claimed:

1. A method for obtaining sulfated nanoparticles of cellulose, or sulfated nanoparticles of mannan, or a combination thereof, from endosperms, comprising:

(a) acquiring a ground flour of an endosperm of a seed, nut, or pit, wherein the ground flour contains polysaccharides, and wherein the polysaccharides contain either cellulose or mannan, or both cellulose and mannan;

(b) pretreating the ground flour to condition the polysaccharides for hydrolysis and functionalization thereof;

(c) preparing a reagent for hydrolysis and functionalization of the polysaccharides, wherein the reagent comprises a solution of glycerol, water, and sulfuric acid at predetermined concentrations;

(d) adding the reagent to the pretreated polysaccharides to form a suspension, wherein adding the reagent to the suspension converts either the cellulose into nanoparticles or the mannan into nanoparticles, or converts both the cellulose and the mannan into nanoparticles, and wherein the nanoparticles are sulfated by the reagent;

(e) separating either the sulfated nanoparticles of cellulose or the sulfated nanoparticles of mannan from the suspension, or separating both the sulfated nanoparticles of cellulose and the sulfated nanoparticles of mannan from the suspension;

(f) washing the nanoparticles;

(g) creating a stable colloidal suspension of the sulfated nanoparticles; and (h) homogenizing the stable colloidal suspension at 5-20 RPM for 2-10 minutes.

2. The method of claim 1, wherein the endosperm is the endosperm of a tagua nut or ivory nut from a tagua palm (*Phytelephas aequatorialis*) or other member of the *Phytelephas* genus, or a nut or seed from another type of palm tree.

3. The method of claim 1, wherein the endosperm is the endosperm of a nut or pit from an avocado, date, coffee bean, peach, apricot, or nectarine; or wherein the endosperm is the endosperm of a seed of a cereal or grain.

4. The method of claim 1, wherein the endosperm is the endosperm of a seed, nut, or pit that contains hemicellulose, cellulose, or a combination thereof.

5. The method of claim 1, wherein pretreating the ground flour further includes:
(a) extracting polysaccharides from the flour by mixing sodium hydroxide, potassium hydroxide, or other alkaline material or materials with the flour;
(b) incubating the mixture for a predetermined time at a predetermined temperature;
(c) washing out any excess sodium hydroxide, potassium hydroxide, or other alkaline material or materials to form a solid material;
(d) washing the solid material until the solid material changes to a color that indicates removal of impurities therefrom; and
(e) optionally, drying the washed solid material for a predetermined time at a predetermined temperature.

6. The method of claim 1, wherein pretreating the ground flour further includes extracting polysaccharides from the flour using strong acids, urea, other chaotropic solutions that disrupt polysaccharide hydrogen bonding and ultrastructures, or a combination thereof.

7. The method of claim 1, wherein preparing the reagent for hydrolysis and functionalization of the polysaccharides further includes:
(a) combining 30% v/v glycerol and 25% v/v deionized water to form a solution;
(b) cooling the solution to 4° C.;
(c) adding 45% v/v of concentrated sulfuric acid dropwise to the cooled solution;
(d) maintaining the temperature of the solution at or below 10° C.;
(e) stirring the solution at 500 rpm; and
(f) increasing temperature of the solution to 30-60° C. with continuous agitation for 1-5 hours.

8. The method of claim 5, wherein adding the reagent to the pretreated polysaccharides to form a suspension further includes:

(a) adding the solid material to the reagent for hydrolysis and functionalization of the polysaccharides in a proportion ranging from 1:6 to 1:10 w/v to form a suspension; and
(b) stirring the suspension at 100 to 1000 rpm for 1 to 5 hours at a temperature of 30 to 60° C.

9. The method of claim 1, further comprising stopping the hydrolysis and functionalization reaction by adding water in a proportion of 2 to 20 parts water to reaction volume (v/v).

10. The method of claim 1, wherein separating either the sulfated nanoparticles of cellulose or the sulfated nanoparticles of mannan from the suspension, or separating both the sulfated nanoparticles of cellulose and the sulfated nanoparticles of mannan from the suspension further includes:
(a) using gravity sedimentation at a rate of 0.0001 to 500 mL/min; or
(b) using centrifugation at a gravitational force greater than 10 times gravity for a time of 2 minutes or greater; or
(c) washing a precipitated nanoparticle fraction having a supernatant fraction by discarding the supernatant and resuspending the precipitated nanoparticle fraction in water.

11. The method of claim 10, wherein the stable colloidal suspension is formed by:
(a) repeating the washing step until the pH of the suspension reaches a pH of 1.7-1.9 prior to final suspension, or until the suspended material remains in a stable colloidal suspension that does not sediment at 1× gravity; or
(b) dialyzing the resuspended sediment against water to reach a stable colloidal suspension of the nanoparticles.

12. The method of claim 1, further comprising adding sodium bicarbonate or other predetermined alkaline material to adjust the pH of the colloidal suspension to between 3.0 and 8.0.

13. The method of claim 1, further comprising using either dialysis or diafiltration to purify the stable colloidal suspension of sulfated polysaccharide particles.

14. The method of claim 1, further comprising including the sulfated nanoparticles of cellulose, mannan, or a combination thereof in a pharmaceutical formulation, a cosmetic formulation, a wound healing formulation, or a skin treatment formulation.

15. A method for obtaining sulfated nanoparticles of cellulose, or sulfated nanoparticles of mannan, or a combination thereof, from endosperms, comprising:
(a) acquiring a ground flour of an endosperm of a seed, nut, or pit, wherein the ground flour contains polysaccharides, and wherein the polysaccharides contain either cellulose or mannan, or both cellulose and mannan;
(b) pretreating the ground flour to condition the polysaccharides for hydrolysis and functionalization thereof;
(c) preparing a reagent for hydrolysis and functionalization of the polysaccharides, wherein the reagent comprises a solution of glycerol, water, and sulfuric acid at predetermined concentrations;
(d) adding the reagent to the pretreated polysaccharides to form a suspension, wherein adding the reagent to the suspension converts either the cellulose into nanoparticles or the mannan into nanoparticles, or converts both the cellulose and the mannan into nanoparticles, and wherein the nanoparticles are sulfated by the reagent;
(e) stopping the hydrolysis and functionalization reaction;

(f) separating either the sulfated nanoparticles of cellulose or the sulfated nanoparticles of mannan from the suspension, or separating both the sulfated nanoparticles of cellulose and the sulfated nanoparticles of mannan from the suspension;

(g) washing the nanoparticles;

(h) creating a stable colloidal suspension of the sulfated nanoparticles;

(i) adjusting the pH of the colloidal suspension to between 3.0 and 8.0; and (j) homogenizing the stable colloidal suspension at 5-20 RPM for 2-10 minutes.

16. The method of claim 15, (a) wherein the endosperm is the endosperm of a tagua nut or ivory nut from a tagua palm (*Phytelephas aequatorialis*) or other member of the *Phytelephas* genus, or a nut or seed from another type of palm tree; or (b) wherein the endosperm is the endosperm of a nut or pit from an avocado, date, coffee bean, peach, apricot, or nectarine; or (c) wherein the endosperm is the endosperm of a seed of a cereal or grain; or (d) wherein the endosperm is the endosperm of a seed, nut, or pit that contains hemicellulose, cellulose, or a combination thereof.

17. The method of claim 15, wherein pretreating the ground flour further includes:

(a) extracting polysaccharides from the flour by mixing sodium hydroxide, potassium hydroxide, or other alkaline material or materials with the flour;

(b) incubating the mixture for a predetermined time at a predetermined temperature;

(c) washing out any excess sodium hydroxide, potassium hydroxide, or other alkaline material or materials to form a solid material;

(d) washing the solid material until the solid material changes to a color that indicates removal of impurities therefrom; and (e) optionally, drying the washed solid material for a predetermined time at a predetermined temperature.

18. The method of claim 15, wherein pretreating the ground flour further includes extracting polysaccharides from the flour using strong acids, urea, other chaotropic solutions that disrupt polysaccharide hydrogen bonding and ultrastructures, or a combination thereof.

19. The method of claim 15, wherein preparing the reagent for hydrolysis and functionalization of the polysaccharides further includes:

(a) combining 30% v/v glycerol and 25% v/v deionized water to form a solution;

(b) cooling the solution to 4° C.;

(c) adding 45% v/v of concentrated sulfuric acid dropwise to the cooled solution;

(d) maintaining the temperature of the solution at or below 10° C.;

(e) stirring the solution at 500 rpm; and (f) increasing temperature of the solution to 30-60° C. with continuous agitation for 1-5 hours.

20. The method of claim 17, wherein adding the reagent to the pretreated polysaccharides to form a suspension further includes:

(a) adding the solid material to the reagent for hydrolysis and functionalization of the polysaccharides in a proportion ranging from 1:6 to 1:10 w/v to form a suspension; and (b) stirring the suspension at 100 to 1000 rpm for 1 to 5 hours at a temperature of 30 to 60° C.

21. The method of claim 15, further comprising stopping the hydrolysis and functionalization reaction by adding water in a proportion of 2 to 20 parts water to reaction volume (v/v).

22. The method of claim 15, wherein separating either the sulfated nanoparticles of cellulose or the sulfated nanoparticles of mannan from the suspension, or separating both the sulfated nanoparticles of cellulose and the sulfated nanoparticles of mannan from the suspension further includes:

(a) using gravity sedimentation at a rate of 0.0001 to 500 mL/min; or (b) using centrifugation at a gravitational force greater than 10 times gravity for a time of 2 minutes or greater; or (c) washing a precipitated nanoparticle fraction having a supernatant fraction by discarding the supernatant and resuspending the precipitated nanoparticle fraction in water.

23. The method of claim 22, wherein the stable colloidal suspension is formed by:

(a) repeating the washing step until the pH of the suspension reaches a pH of 1.7-1.9 prior to final suspension, or until the suspended material remains in a stable colloidal suspension that does not sediment at 1× gravity; or (b) dialyzing the resuspended sediment against water to reach a stable colloidal suspension of the nanoparticles.

24. The method of claim 15, further comprising adding sodium bicarbonate or other predetermined alkaline material to adjust the pH of the colloidal suspension to between 3.0 and 8.0.

25. The method of claim 15, further comprising including the sulfated nanoparticles of cellulose, mannan, or a combination thereof in a pharmaceutical formulation, a cosmetic formulation, a wound healing formulation, or a skin treatment formulation.

* * * * *